United States Patent [19]
Abraham et al.

[11] Patent Number: 5,833,718
[45] Date of Patent: Nov. 10, 1998

[54] SODIUM POTASSIUM SULFIDE COMPOSITION AND METHOD FOR PREPARING SAME

[75] Inventors: Fred Abraham, Wheeling; Frank E. Gilmore, II, Glen Dale, both of W. Va.

[73] Assignee: PPG Industries, Inc., Pittsburgh, Pa.

[21] Appl. No.: 664,065

[22] Filed: Jun. 13, 1996

[51] Int. Cl.$^6$ .............................. G14C 1/06; C01B 17/22
[52] U.S. Cl. ................ 8/94.16; 423/566.2; 252/8.57
[58] Field of Search ................ 423/566.2; 8/94.16; 252/8.57

[56] References Cited

U.S. PATENT DOCUMENTS

| | | |
|---|---|---|
| 330,716 | 11/1885 | Kennedy . |
| 330,790 | 11/1885 | Kennedy . |
| 1,379,855 | 5/1921 | Donner . |
| 1,743,938 | 1/1930 | Taylor . |
| 2,016,260 | 10/1935 | Turley ........................................... 149/2 |
| 2,937,068 | 5/1960 | Panepinto ................................. 8/94.16 |
| 2,945,737 | 7/1960 | Thorstensen .............................. 8/94.16 |
| 3,544,596 | 12/1970 | Dillard ................................. 260/332.8 |
| 3,574,516 | 4/1971 | Heidemann et al. .................... 8/94.16 |
| 3,846,538 | 11/1974 | Renault et al. .......................... 423/183 |
| 4,127,470 | 11/1978 | Baird, Jr. et al. .......................... 208/58 |
| 4,606,812 | 8/1986 | Swanson ................................. 208/108 |
| 5,149,295 | 9/1992 | Bowling et al. .......................... 452/71 |

OTHER PUBLICATIONS

Potassium Sodium Sulfide, KNaS, a New Inter–Alkali Metal Sulfide by Sabrowsky et al, Z. Anorg.Allg. Chem., 546, 169–176, 1987 (Abstract).

*Primary Examiner*—Gary P. Straub
*Attorney, Agent, or Firm*—Irwin M. Stein

[57] ABSTRACT

Describes an aqueous composition of sodium potassium sulfide and methods for preparing this inter-alkali metal sulfide. One method described is the addition of sodium hydrosulfide to potassium hydroxide in an aqueous reaction medium. The aqueous sodium potassium sulfide composition preferably contains a slight excess of alkali metal hydrosulfide, e.g., sodium hydrosulfide. The sodium potassium sulfide is useful as a depilatory for removing hair from the hides of animals consumed as food.

19 Claims, No Drawings

SODIUM POTASSIUM SULFIDE COMPOSITION AND METHOD FOR PREPARING SAME

DESCRIPTION OF THE INVENTION

This invention relates to aqueous compositions of sodium potassium sulfide and to methods for preparing sodium potassium sulfide.

In the meat industry, and particularly in those areas devoted to the processing of beef and pork, meat packers slaughter animals in a process in which the animals are stunned, bled, skinned, eviscerated and fabricated into meat sections, which are marketed to the public or the restaurant trade. An animal enters a meat slaughter plant with various foreign materials attached to its hair. Such foreign materials include dirt, manure, mud and vegetative material. An animal's hair is also contaminated with a multitude of microorganisms, some of which are pathogenic to humans.

The meat industry has recognized the advantages of removing hair from animals to be slaughtered to avoid and control contamination of the meat and meat by-products produced in the slaughtering plant and to facilitate the slaughtering process. See, for example, U.S. Pat. Nos. 1,743,938 and 5,149,295. The depilatory agent commonly used to remove hair from an animal's hide is sodium sulfide or sodium hydrosulfide. Other depilatory agents described in the literature are a composition of thioglycolic acid, sodium hydroxide and calcium oxide, and a composition of sodium hydroxide and hydrogen peroxide.

It has now been discovered that aqueous compositions of sodium potassium sulfide can be used as a depilatory agent for the removal of hair from animals. This material has the advantage of reducing the amount of sodium discharged from the slaughtering plant, which can be an environmental benefit, while retaining the depilatory benefits of sodium sulfide. The aqueous sodium potassium sulfide composition of the present invention is not a mixture of sodium and potassium monosulfides but a composition comprising the compound, sodium potassium sulfide, i.e., NaKS.

The preparation of anhydrous, hygroscopic colorless crystals of potassium sodium sulfide are described in Z. Anorg. Allg. Chem., 546, 169–176 (German), 1987 by Sabrowsky et al. These crystals, which are described as a new inter alkali metal sulfide, were prepared by annealing a mixture of sodium sulfide and potassium sulfide.

DETAILED DESCRIPTION OF THE INVENTION

The sodium potassium sulfide of the present invention can be described chemically as the monosulfide of sodium and potassium; namely, NaKS. This inter-alkali metal sulfide may be prepared by reacting sodium hydrosulfide with potassium hydroxide, or by reacting sodium hydroxide with potassium hydrosulfide at temperatures of from −10° F. to 220° F. (−23.30° C. to 104.4° C.), preferably, from 40° F. to 160° F. (4.40° C. to 71.1° C.), more preferably about 140° F. (60° C.) in an aqueous reaction medium. The reaction can be described as a neutralization reaction.

In conducting the reaction of the hydrosulfide with the hydroxide, the reactants are preferably used in substantially stoichiometric molar amounts. The mole ratio of the hydrosulfide to the hydroxide may however vary from 1:1.5 to 1.5:1, preferably, from 0.9:1 to 1:0.9. As stated, the mole ratio is preferably substantially 1:1. When using other than stoichiometric amounts, the resultant product composition comprising the sodium potassium sulfide will contain also the amount of starting reactant used in excess of the required stoichiometric amount. Preferably, the reaction product contains only a small amount of the reactant used in excess.

Regardless of which alkali metal hydroxide and which alkali metal hydrosulfide is used, it is preferred that the sodium potassium sulfide reaction product contain an excess of the alkali metal hydrosulfide. This may be accomplished by using a stoichiometric excess of the alkali metal hydrosulfide, or by adjusting the product reaction mixture to contain an excess of the alkali metal hydrosulfide. Preferably, the alkali metal hydrosulfide used is sodium hydrosulfide.

The amount of excess alkali metal hydrosulfide present in the sodium potassium sulfide aqueous composition may vary and will depend to a large extent on the application where the inter-alkali sulfide of the present invention is used. The alkali metal hydrosulfide is slower acting than the alkali metal sulfide when used as a depilatory. Hence, it is preferred that the amount of alkali metal hydrosulfide in the sodium potassium sulfide is limited. Aqueous compositions of sodium potassium sulfide will preferably contain from 0.01 to 5 weight percent of the alkali metal hydrosulfide (although higher amounts may be present), more preferably from 0.1 to 1.5 weight percent alkali metal hydrosulfide, and still more preferably from 0.25 to 0.5 weight percent of the alkali metal hydrosulfide. When used as a depilatory, the aqueous sodium potassium sulfide should contain less than 0.5 weight percent of the alkali metal hydroxide, and preferably is substantially free of alkali metal hydroxide alkalinity, to avoid damaging the animal's hide.

In accordance with one embodiment of the process of the present invention, an aqueous liquor of the alkali metal hydrosulfide; namely, sodium or potassium hydrosulfide, is added to an aqueous solution of the alkali metal hydroxide; namely, potassium hydroxide or sodium hydroxide respectively, at a temperature above the freezing temperature of the reactants or the reaction product. Preferably, sodium hydrosulfide is added to potassium hydroxide. The reactants are admixed with stirring over a short time, e.g., 2 to 5 minutes. A vortex formed by rapid mixing should be avoided. Little or no cooling of the reaction mixture is needed to remove the heat of reaction because the heat of reaction is moderate. After the reactants are thoroughly mixed, stirring should be stopped and the reaction vessel or storage vessel covered to keep air from contacting the reaction product.

The aqueous product produced by the aforedescribed reaction is a yellow-colored liquor at reaction temperatures of, for example, 140° F. (60° C.). Allowing the aqueous reaction product to cool may produce a slurry if the freezing point of the product is exceeded. The solubility of sodium potassium sulfide in water is dependent on the concentration of the compound and the temperature of the aqueous composition. For example, the freezing point of a 43 weight percent NaKS aqueous composition is 147° F. (63.9° C.); whereas a 9.6 weight percent NaKS aqueous composition has a freezing point of 15° F. (−9.4° C.).

The reaction mixture may be prepared containing from as little as 5 weight percent to as much as 60 weight percent of the active ingredient (referred to as dissolved solids); namely, the NaKS and the excess reactant. In a preferred embodiment, the reaction mixture contains from 20 to 45 percent of dissolved solids to avoid handling large quantities of water.

In the step of applying a depilatory substance to an animal, the depilatory is applied by any convenient method to the hair on the animal's hide and allowed to react with the hair for an appropriate time for the intended purpose. Typically, the concentration of the depilatory (in the case of sulfides) applied to animal hides is from 5 to 15 percent, e.g., from 6 to 12 percent. The aqueous product mixture of the present invention may be diluted with water to reduce the concentration of the sodium potassium sulfide to a concentration within that of the aforedescribed concentration ranges. Following application of the depilatory to the hair of the animal, the hair may be removed by conventional practices, e.g., by pressurized water.

The aqueous composition of sodium potassium sulfide of the present invention may be used as a depilatory for removing hair from the hides of animals. As used herein, the term "animal" refers to any mammal of the kingdom Animalia that is consumed as food by humans or animals, including without limitation, bovine, ovine and porcine. The term "hide" refers to the integument of an animal, such as bovine hide, a porcine skin and an ovine pelt.

Other than in the operating examples, or where otherwise indicated, all numbers, ranges, ratios, etc., expressing quantities of reactants or reaction conditions used herein are to be understood as modified in all instances by the term "about". All percentages are weight percent, except where otherwise indicated.

The present invention is more particularly described in the following examples which are intended as illustrative only, since numerous modifications and variations therein will be apparent to those skilled in the art.

EXAMPLE 1

To a 2 liter glass resin kettle was added 100.18 grams of potassium hydroxide (KOH) and 117.56 grams of water to obtain 217.74 grams of a 46.01% solution of KOH. An aqueous solution of 100 grams of sodium hydrosulfide (NaHS) in 119.11 grams of water was also prepared. Both solutions were heated in an oven to 140° F. (60° C.), which required about 20 minutes. The solutions were removed from the oven and the NaHS solution was added rapidly (over a period of two minutes) to the KOH solution with mixing. The mole ratio of NaHS to KOH was essentially 1:1, but with a very slight excess of NaHS (as determined by titration). The temperature of the reaction mixture rose from 140° F. (60° C.) to 145° F. (62.7° C.). The reaction mixture was yellow, free of solids and contained 38.47 weight percent NaKS and 0.18 weight percent NaHS. The reaction mixture was adjusted by the addition of 230 grams of water to contain 25.2 weight percent NaKS and 0.12 weight percent NaHS.

EXAMPLE 2

Following the procedure of Example 1, 325.00 grams of anhydrous NaHS was dissolved in 387.1 grams of water to form a 45.6% NaHS solution. Separately, 383.0 grams of anhydrous KOH pellets (85% assay) were dissolved in 1,131.3 grams of water to form an aqueous solution of 21.5 KOH. The two solutions were heated to 140°–150° F. (60°–65.6° C.) and mixed rapidly (over about 5 minutes) with stirring. The reaction mixture contained 25.35 weight percent NaKS and 0.26 weight percent excess KOH. The reaction mixture was adjusted to contain 25.36 weight percent NaKS and 0.14 weight percent excess NaHS by the addition of 24.0 grams of a 45.16 weight percent NaHS aqueous solution.

While the present invention has been described with reference to specific details of certain embodiments thereof, it is not intended that such details should be regarded as limitations upon the scope of the invention except insofar as they are included in the accompanying claims.

I claim:

1. In the method of removing hair from an animal's hide by applying a sulfide depilatory agent to the hide, the improvement comprising using an aqueous solution of sodium potassium sulfide as the sulfide depilatory agent.

2. The method of claim 1 wherein from 0.01 to 5 weight percent as dissolved solids, of alkali metal hydrosulfide selected from the group consisting of sodium hydrosulfide and potassium hydrosulfide is present.

3. The method of claim 2 wherein the amount of alkali metal hydrosulfide ranges from 0.1 to 1.5 weight percent.

4. The method of claim 2 wherein the amount of alkali metal hydrosulfide ranges from 0.25 to 0.5 weight percent.

5. The method of claim 4 wherein the alkali metal hydrosulfide is sodium hydrosulfide.

6. The method of claim 1 wherein the concentration of sodium potassium sulfide in the aqueous solution applied to the hide is from 5 to 15 weight percent.

7. The method of claim 1 wherein the concentration of sodium potassium sulfide in the aqueous solution applied to the hide is from 6 to 12 weight percent.

8. The method of claim 1 wherein from 0.01 to 5 weight percent of sodium hydrosulfide is present.

9. The method of claim 1 wherein the composition is substantially free of alkali metal hydroxide alkalinity.

10. The method of claim 1 wherein less than 0.5 weight percent of alkali metal hydroxide alkalinity is present.

11. The method of claim 10 wherein the alkali metal hydroxide is potassium hydroxide.

12. A method of preparing an aqueous solution of alkali metal sulfide, which comprises mixing with stirring at temperatures above the freezing temperature of the reactants and the alkali metal sulfide, an aqueous solution of alkali metal hydrosulfide reactant selected from the group consisting of sodium hydrosulfide and potassium hydrosulfide, and an aqueous solution of alkali metal hydroxide reactant selected from the group consisting of sodium hydroxide and potassium hydroxide, the alkali metal of the alkali metal hydroxide and the alkali metal of the alkali metal hydrosulfide being different, the mole ratio of the alkali metal hydrosulfide reactant to the alkali metal hydroxide reactant being from 1:1.5 to 1.5:1, thereby to produce an aqueous solution comprising sodium potassium sulfide as a dissolved solid.

13. The method of claim 12 wherein the mole ratio of the alkali metal hydrosulfide to the alkali metal hydroxide is from 0.9:1 to 1:0.9.

14. The method of claim 12 wherein the temperature at which the alkali metal hydrosulfide and the alkali metal hydroxide are mixed is from –10° F. to 220° F.

15. The method of claim 12 wherein the temperature at which the alkali metal hydrosulfide and the alkali metal hydroxide are mixed is from 40° F. to 160° F.

16. The method of claim 12 wherein an aqueous solution of sodium hydrosulfide is added to an aqueous solution of potassium hydroxide.

17. The method of claim 16 wherein substantially stoichiometric amounts of sodium hydrosulfide and potassium hydroxide are used.

18. The method of claim 12 wherein alkali metal hydrosulfide is added to the sodium potassium sulfide product, if required, in amounts sufficient to provide a product that is substantially free of alkali metal hydroxide alkalinity.

19. The method of claim 18 wherein sufficient alkali metal hydrosulfide is added to provide a composition having from 0.01 to 5 weight percent alkali metal hydrosulfide.

* * * * *